United States Patent [19]
Prager

[11] Patent Number: 5,943,670
[45] Date of Patent: Aug. 24, 1999

[54] SYSTEM AND METHOD FOR CATEGORIZING OBJECTS IN COMBINED CATEGORIES

[75] Inventor: John Martin Prager, Pomona, N.Y.

[73] Assignee: International Business Machines Corporation, Armonk, N.Y.

[21] Appl. No.: 08/976,246

[22] Filed: Nov. 21, 1997

[51] Int. Cl.⁶ .................................................. G06F 17/30
[52] U.S. Cl. .................................................. 707/5; 707/6
[58] Field of Search .................... 707/5, 1–4, 6; 704/9

[56] References Cited

U.S. PATENT DOCUMENTS 5,537,586  7/1996  Amram et al. .............................. 707/3

OTHER PUBLICATIONS

Gerard Salton, "Automatic Text Processing: The Transformation, Analysis and Retrieval of Information by Computer", Addison–Wesley, Reading, PA, 1989, pp. 275–281 & 313–326.

C. Ling & W. Wang "Computing Optimal Attribute Weight Settings for Nearest Neighbor Algorithms", Artificial Intelligence Review, vol. 11, pp. 255–256, 1997.

Yahoo (http://www.yahoo.com) screen shot of home page showing top–level categories, 1 page, Date unknown.

"A Self–organizing Network for Mixed Category perception," J. Basak et al., Neurocomputing, vol. 10, issue 4, pp. 341–358, Apr. 1996.

*Primary Examiner*—Thomas G. Black
*Assistant Examiner*—Hosain T. Alam
*Attorney, Agent, or Firm*—Louis J. Percello

[57] ABSTRACT

The present invention is a system and method for determining whether the best category for an object under investigation is a mixture of preexisting categories, and how the mixture is constituted. This invention is useful both for suggesting the need for new categories, and for a fixed set of categories, determining whether a document should be assigned to multiple categories. The objects of the categorization system are typically, but need not be, documents. Categorization may be by subject-matter, language or other criteria. The invention causes extra information to be stored in a category index, so that the determination of mixed categories using the methods presented here is performed extremely efficiently.

4 Claims, 10 Drawing Sheets

| DOCUMENT ID | CATEGORY |
|---|---|
|  |  |
|  |  |
|  |  |

FIG.2c
PRIOR ART

| CATEGORY | SCORE |
|---|---|
|  |  |
|  |  |
|  |  |

FIG.2d
PRIOR ART

| FEATURE | COUNT | WEIGHT |
|---|---|---|
|  |  |  |
|  |  |  |
|  |  |  |
|  |  |  |
| TOTALS |  |  |
| MAGNITUDE |  |  |

FIG.2e
PRIOR ART

| FEATURE | VALUE |
|---|---|
|  |  |
|  |  |
|  |  |
|  |  |
|  |  |

FIG.3a
PRIOR ART

| CATEGORY PAIR | SCALAR PRODUCT |
|---|---|
|  |  |
|  |  |
|  |  |
|  |  |
|  |  |

FIG.3b

| CATEGORY | FEATURE VECTOR | MAGNITUDE |
|---|---|---|
|  |  |  |
|  |  |  |
|  |  |  |
|  |  |  |
|  |  |  |

A l'heure actuelle, il est important de pouvoir compter
sur un partenaire informatique fiable et durable.
Quelqu'un qui sait vous écouter et vous aider progresser.
Cette relation durable, basée sur la confiance, IBM est
en mesure de vous l'offrir. Active depuis 60 ans au service
de ses clients, IBM Belgium entend bien répondre.

Vandaag de dag is het belangrijk te kunnen rekenen
op een duurzame informatica-partner; iemand die
naar u luistert, die u helpt vooruitgaan. IBM kan
u deze duurzame en vertrouwelijke relatie bieden.
Met 60 jaar ervaring ten dienste van haar klanten
wenst IBM Belgium te beantwoorden aan hun behoeften
met een informatica-aanbod op maat.

910

| SCORE | LANGUAGE | | |
|-------|----------|---|---|
| .6651 | DUTCH/FRENCH | RATIO .59/.41 | 925 |
| .6068 | DUTCH | | |
| .5286 | FRENCH | | |
| .3869 | SPANISH | | |
| .3773 | CATALAN | | 920 |

FIG.9

SYSTEM AND METHOD FOR CATEGORIZING OBJECTS IN COMBINED CATEGORIES

FIELD OF THE INVENTION

This invention relates to the field of categorization, including, but not limited to, document categorization. More specifically, the invention relates to determining when documents belong to multiple categories.

BACKGROUND OF THE INVENTION

Two common methods are used to find objects such as documents in a large collection: search and navigation. Searching involves specifying a query which a search engine will match against previously indexed objects, and return a hit-list of the best matching objects, possibly with an associated relevance score. The IBM SearchManager/2, a trademark of the IBM Corporation, is an example of such a system. The methods of indexing and searching for documents are well-known in the industry.

Navigation is possible if the objects have been previously organized into, e.g., a hierarchy. This organization will have been developed by categorizing the objects by selected criteria. Given such a system, the user typically finds an object by starting at a well-defined point such as the top of the hierarchy, and progressing down to levels of greater and greater specificity until a leaf-node category is reached; these contain just a few objects, where the desired one or ones can be found by inspection. In addition, systems can offer a combination of search and navigation. Yahoo (http://www.yahoo.com) is an example of such a system.

The indexing component of a categorization system takes an object such as a document and assigns to it one or more labels from a predefined set. The labels available correspond to the categories under consideration.

The categories form a way of grouping objects that are similar according to one or more criteria. For example, the set of categories might correspond to the language a document is written in. In this case, the label for a category, and for documents in that category, will be the name of the language. World-Wide-Web search engines such as AltaVista (http://www.altavista.digital.com) associate a language tag with every document returned in a hit list. These tags were assigned by an automatic process.

Another useful categorization scheme is by subject-matter. Yahoo has categorized several hundred thousand documents into tens of thousands of categories, although this process was done by hand, over several years. However, to keep track of huge collections such as the World-Wide-Web, or to develop navigation systems for company intranets or other domains, especially if processing time must be minimized, categorizing automatically is of increasing importance.

There are several different methods to perform categorization: two will be described here in the context of text document categorization. All methods require a set of categories, and a set of previously categorized objects, for training. The so-called 'centroid' or 'vector-space' method works as follows. A feature-selector program is used to extract interesting qualities from the documents. These features are usually words, possibly with common words or 'stop-words' (such as 'the', 'of' etc.) filtered out. For each category, a vector is generated from the documents assigned to that category. The positions in the vector correspond to the features, the value at a given position the number of occurrences of the feature in the set of documents making up the category, possibly multiplied by a weighting factor. A similar such vector is generated for the document to be categorized. Then for each category, the 'cosine-distance' is calculated between the category vector and the test document vector. The cosine-distance is the scalar product of the two vectors divided by the product of the vector magnitudes; it is also equal to the cosine of the angle between the vectors in n-space. Since it is a cosine, it falls in the range 0–1, where 0 represents orthogonality and 1 exact correspondence. In this way, the system generates a hit-list of categories with matching scores. For a description of vector-space methods in Information Retrieval, see G. Salton, "Automatic Text Processing: The Transformation, Analysis and Retrieval of Information by Computer", Addison-Wesley, Reading, Pa., 1989.

Another common method is the KNN, or K-nearest-neighbor method (see, for example, C. Ling & H. Wang "Computing Optimal Attribute Weight Settings for Nearest Neighbor Algorithms", Artificial Intelligence Review vol 11, pages 255–272). In this method the document to be categorized is treated as a query to a search engine, whose index is generated from all of the documents in the categorizer's training set. The hit-list generated here is the list of the best-matching documents to the one in question. The top K documents from this list are selected. Since each document is part of the training set, it has been assigned to one or more categories. Hence each document imparts a 'vote' to each category it belongs to. This vote may be weighted by unity or by the relevance score returned by the search engine. In any case, the total number of votes received by each category is tallied, and used to provide the category hit-list.

Given the category hit-list, systems usually employ one of the following techniques for purposes of committing category assignments to the document: 1) the top category is selected, 2) the top m categories are selected, for some predefined constant m, 3) all categories which have a score greater than a threshold t are selected, and 4) the top category plus any categories which have a score greater than a threshold t are selected. Minor variations of these are also possible.

STATEMENT OF PROBLEMS WITH THE PRIOR ART

When categorization systems operate, they produce for the object under consideration a hit-list of proposed categories, with scores. Ideally, there would only be one category on the hit-list, with a score of 100%, but in practice, due to noise in the object, noise in the category definitions, and overlapping categories, this never happens. Sometimes an object truly should belong to more than one category, and this can happen in two ways: 1) two (or more) categories overlap in their definition, and the object properly belongs to their intersection, and 2) the object is composed of features taken from two (or more) categories which don't overlap. (Obviously, a combination of situations #1 and #2 could occur too). It is the second of these cases which is the focus of this invention, although the system and method developed applies equally well to the former case (or the combination) too.

It is impossible to tell directly from a categorizer's hit-list whether the second (and beyond) categories in the hit-list belong there due to either of the reasons listed above, or noise, or some combination. Especially if the scenario in which the categorizer is employed requires that objects get assigned to a single category, it is important to know which case applies. In particular, if an object is composed of features taken from two categories (say), then rather than having only moderate evidence for each of them, there is strong evidence that the object belongs to a new category which is a mixture of the two original categories. The prior art does not distinguish this case.

OBJECTS OF THE INVENTION

An object of this invention is a system and method that categorizes documents.

An object of this invention is a system and method that categorizes documents into both categories from an originally-defined set, and into virtual mixed categories constructed by making weighted means of pairs of original categories.

An object of this invention is a system and method that categorizes documents into both categories from an originally-defined set, and into virtual mixed categories constructed by making weighted means of pairs of original categories, and determining what values of the weights give the mixed categories the best matches.

SUMMARY OF THE INVENTION

The present invention is a system and method for determining whether the best category for an object under investigation is a mixture of preexisting categories, and how the mixture is constituted.

The objects of the categorization system are typically, but need not be, documents. Categorization may be by subject-matter, language or other criteria.

This invention describes an improvement to the 'centroid' or 'vector-space' method of categorization. A set of training documents, whose categories have been manually assigned, are indexed by generating features vectors for each category, from the documents assigned to the category. Some additional numerical values are calculated at indexing time and stored in the index. When a document is to be categorized, its feature vector is compared against feature vectors of the categories stored in the index. This provides a 'hit-list' of matching categories, with scores. For the best of these matching categories, a new calculation is performed, using the categories' scores and the extra information stored in the index, to see if the document would match better with a mixture of categories than with single categories. In the case a mixture is found, the proportions (weights) of the component categories are identified and used to create a virtual category that is a combination of the component categories. Using the extra information and the proportions/weights, a degree of match (e.g. score) between the virtual category and the document is determined.

In alternative embodiments, this invention can be used with other than vector-space categorization systems. In these cases the non-vector-space categorization method would be used to generate the first hit-list, but the vector-space calculation would be have to be performed in full on the best categories in the hit-list to determine the mixed categories.

This invention is useful both for suggesting the need for new categories, and for a fixed set of categories, determining whether a document should be assigned to multiple categories. One practical advantage of such a determination is to bring to the attention of users the possibility that new categories might need to be developed for the categorizer being used, where these new categories are a combination of existing categories.

BRIEF DESCRIPTION OF THE DRAWINGS

The foregoing and other objects, aspects and advantages will be better understood from the following detailed description of preferred embodiments of the invention with reference to the drawings that are include the following:

FIG. 2, comprising FIGS. 2a, 2b, 2c, 2d, and 2e, shows the steps and data-structures in the categorization process.

FIG. 3, comprising FIGS. 3a, 3b and 3c shows data-structures used in the category index.

DETAILED DESCRIPTION OF THE INVENTION

Figure 1:
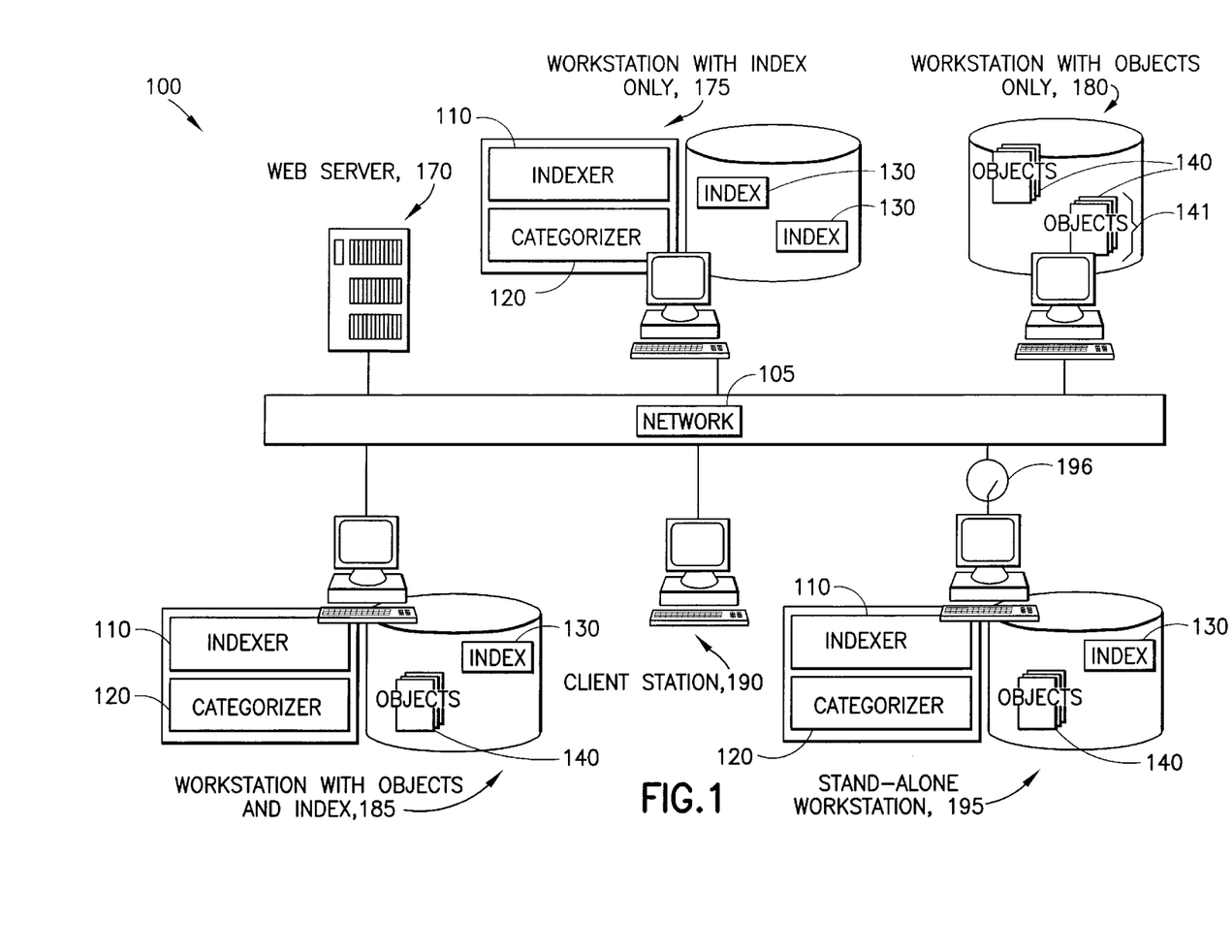
FIG. 1 is a block diagram of the various system configurations that are preferred embodiments of this invention.

FIG. 1 is a block diagram of the computing environment in which the present invention is used in a non-limiting preferred embodiment. The figure shows some of the possible hardware, software, and networking configurations that make up the computing environment. The computing environment or system 100 comprises one or more general purpose computers 170, 175, 180, 185, 190, and 195 interconnected by a network 105. Examples of general purpose computers include the IBM Aptiva personal computer, the IBM RISC System/6000 workstation, and the IBM POWERparallel SP2. (These are Trademarks of the IBM Corporation.) The network 105 may be a local area network (LAN), a wide area network (WAN), or the Internet. Moreover, the computers in this environment may support the Web information exchange protocol (HTTP) and be part of a local Web or the World Wide Web (WWW). Some computers (e.g., 195) may occasionally or always be disconnected 196 from the network and operate as stand-alone computers.

Objects 140 are items (general documents) such as books, articles, reports, pictures, movies, or recordings that contain text, images, video, audio, or any other object and/or information that may be categorized. Categorization is performed by extraction of features from these objects. The most common kind of document is the text document, and the most commonly used feature is the word or derivative of it. The rest of this invention will be described in terms of text documents and word-based features, but it applies to any kind of object from which features can be extracted. One or more objects are stored on memory on one or more computers in the environment.

Figure 2A:
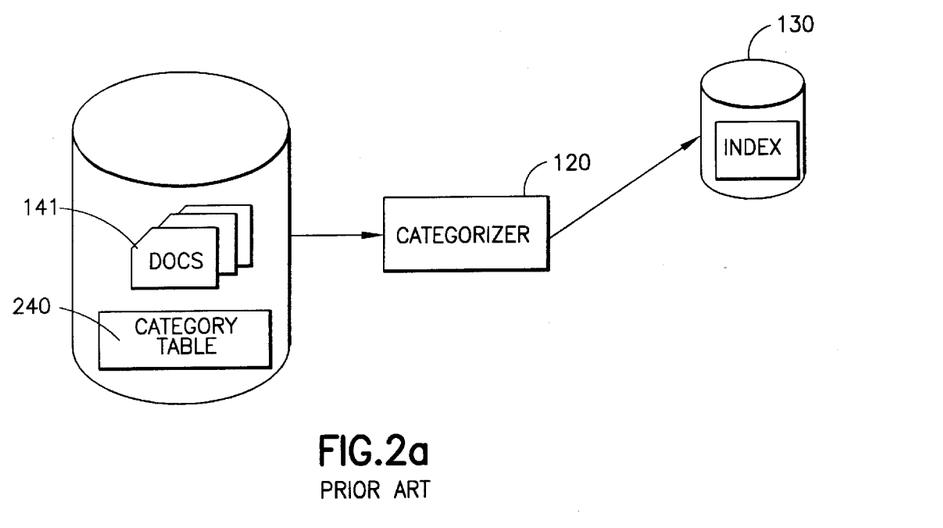
FIG. 2a is a block diagram of a prior art categorizer indexer or training system.

The indexer 110 creates an index 130 by processing a particular set of manually-categorized objects 141 in the environment (see FIG. 2a). This object collection 141 may comprise objects located anywhere in the computing environment, e.g., spread across two or more computers. This indexing process is also known as the categorizer training process.

To categorize a particular object in the environment, the object (see FIG. 2b) is submitted for processing to a categorizer 120 running on a computer in the environment. The categorizer uses an index 130 to identify categories that are relevant to the object. The relevant categories identified by the index are ranked and returned by the categorizer in the form of a hit-list (the results table in FIG. 2d). This overall process is well known in the prior art, but new details are disclosed in this invention in both the indexing and categorization processes that enable mixed-category categorization.

Objects 140 and/or indexes 130 on one computer may be accessed over the network by another computer using the Web (http) protocol, a networked file system protocol (e.g., NFS, AFS), or some other protocol. Services on one computer (e.g., categorizer 120) may be invoked over the network by another computer using the Web protocol, a remote procedure call (RPC) protocol, or some other protocol.

A number of possible configurations for accessing objects, indexes, and services locally or remotely are depicted in the present figure. These possibilities are described further below.

One configuration is a stand-alone workstation 195 that may or may not be connected to a network 105. The stand-alone system 195 has objects 140 and an index 130 stored locally. The stand-alone system 195 also has a categorizer 120 and indexer 110 installed locally. When the system is used for indexing, objects are processed by indexer 110 producing the index 130. When the system is used for categorization, an object is input to the workstation 195 and processed by the local categorizer 120 using the index 130. The results from the categorizer are output by the workstation 195.

A second configuration is 185, a workstation with objects and indexes connected to a network 105. This configuration is similar to the stand-alone workstation 195, except that 185 is always connected to the network 105. Also, the local index 130 may be derived from local objects 140 and/or remote objects accessed via the network 105, and created by either a local indexer 110 or a remote indexer 110 accessed via the network 105. When objects are input at the workstation 185, they may be processed locally at 185 using the local categorizer 120, and local index 130. Alternatively, the local categorizer 120 may access a remote index 130 (e.g. on system 175) via the network 105. Alternatively, the workstation 185 may access a remote categorizer 120 and/or indexer 110 via the network 105.

Another possible configuration is 175, a workstation with an index only. Computer 175 is similar to computer 185 with the exception that there are no local objects 140. The local index 130 is derived from objects 140 accessed via the network 105. Otherwise, as in computer 185, the index 130, categorizer 120, and indexer 110 may be accessed locally or remotely via the network 105 when processing objects.

Another possible configuration is computer 180, a workstation with objects only. The objects 140 stored locally at computer 180 may be accessed by remote indexers 110 via the network 105. When objects are entered at computer 180, the categorizer 120, and index 130 must all be accessed remotely via the network 105.

Another possible configuration is computer 190, a client station with no local objects 140, index 130, categorizer 120, or indexer 110. When objects are entered at computer 190, the categorizer 120 and index 130 must all be accessed remotely via the network 105.

Another possible configuration is computer 170, a typical web server. Objects are entered at another workstation (e.g., 175, 180, 185, or possibly 195) or a client station (e.g., 190) and sent for processing to the web server 170 via the network 105. The web server 170 uses a remote categorizer 120, and index 130 (accessed via the network 105) to process the object. Alternatively, one or more of these functions (120 and 130) can reside on the web server 170. The results are returned to the workstation or client station from which the object was originally sent.

FIG. 2, comprising FIGS. 2a, 2b, 2c, 2d and 2e, depicts typical prior art categorization processes and data-structures. FIG. 2a depicts a typical categorizer training process. Documents 140, which are assigned to categories in category table 240, are input to indexer 110, resulting in index 130. To perform indexing, the indexer 110 runs process 400 depicted in FIG. 4, and explained later.

Figure 2B:
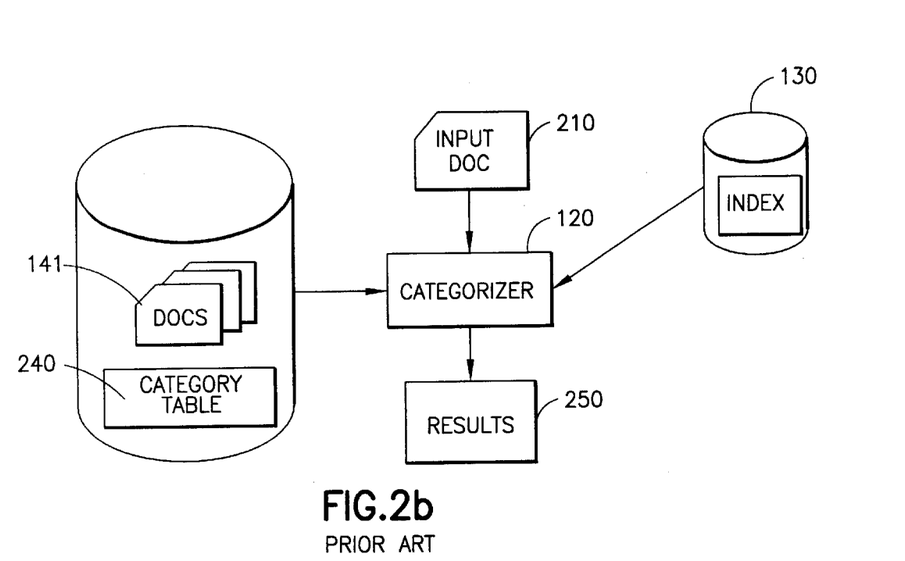
FIG. 2b is a prior art categorization process.

FIG. 2b depicts a typical categorization process. Index 130, which contains feature-vectors for all categories of interest, is input to categorizer 120, along with document to be categorized 210. To perform categorization, the categorizer 120 runs process 500 depicted in FIG. 5 and explained later. The outcome of the categorization process is a results table (hit-list) 250.

Figure 2C:
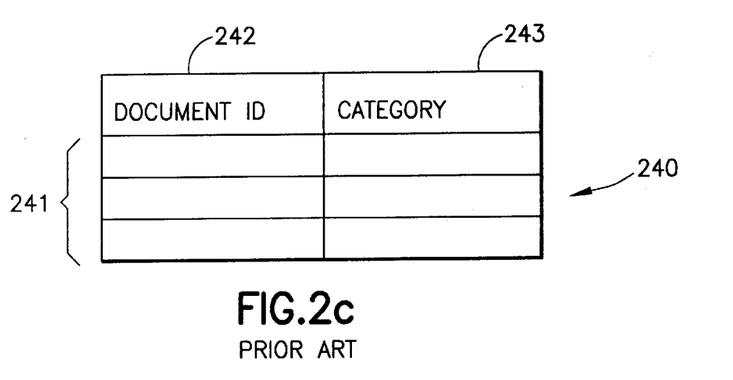
FIG. 2c is a prior art category table, FIG. 2d a prior art results table, and FIG. 2e a feature table.

FIG. 2c depicts a category table 240. It is used to contain one record 241 per 'training' document whose category is known. Column 242 holds the document ID and 243 the category or categories to which it is assigned.

Figure 2D:
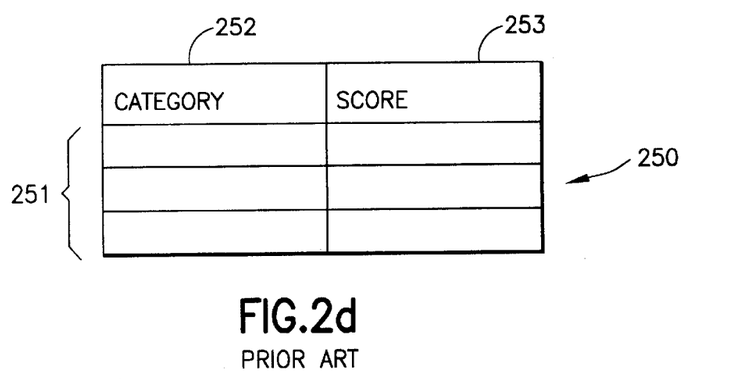

FIG. 2d depicts a results table 250 for the top-ranking categories 251 found on categorizing a document. Column 252 holds the category name, and column 253 the score. If the categorization process is vector-space based, the score 253 will be in the range 0–1. The visual presentation of results table 250 is usually called a 'hit-list'.

Figure 2E:
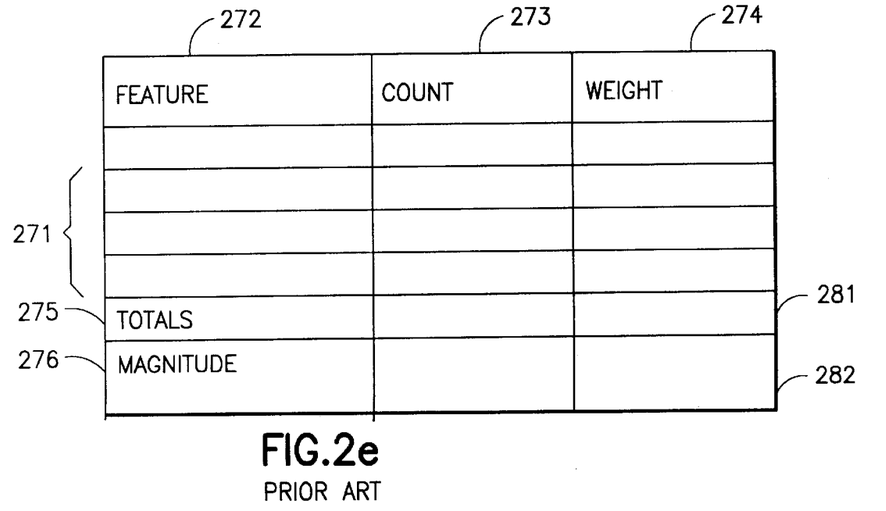

FIG. 2e depicts a feature-table 270 from which the feature-vectors are constructed. Feature table 270 is reused for the computation of indexing values for every category of interest in turn, and for documents being categorized. When completed for a category, the values in the table are copied out into other structures. Each row 271 contains a feature 272, the number of occurrences of the feature 273, and a weighted count 274. The weighting function used can be arbitrary, and many are described in the Information Retrieval literature. The Salton reference discusses this issue at length. A commonly used weight is the so-called tfxidf, or term frequency times inverse document frequency weight (see Salton, p280). The term frequency is the number of occurrences of the term (in this case, the feature), and the inverse document frequency is often a simple formula, in which the term for the number of documents containing the feature appears in the denominator. The exact form of this formula is immaterial to this invention, and in fact the identity function, which just copies the count field 273 into the weight field 274, will be perfectly satisfactory. Feature table 270 additionally contains row 275, to hold totals of the numerical values in rows 271, in columns 273 and 274. Additionally, row 276 holds the square root of the sum of the squares of the numerical values in rows 271, in columns 273 and 274. Cell 281 is the intersection of row 275 and weight column 274, and represents the sum of the weight values. Cell 282 is the intersection of row 276 and weight column 274, and represents the magnitude of the weighted vector.

Figure 3A:
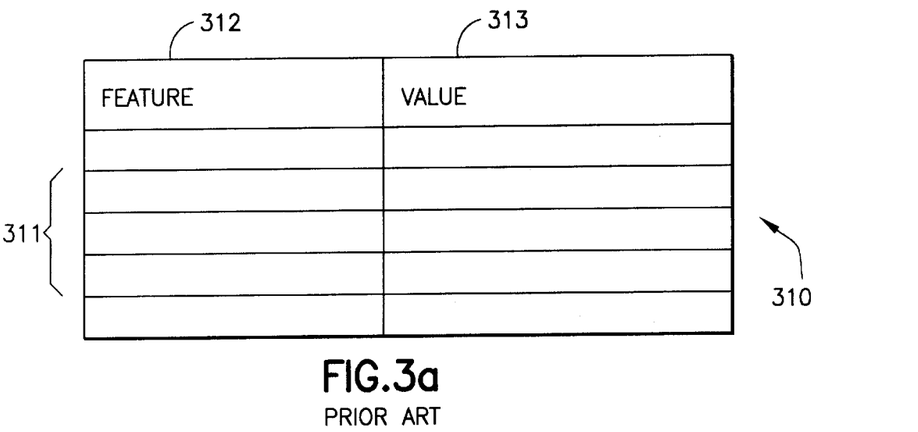
FIG. 3a shows a prior art feature vector, FIG. 3b a scalar product table, and FIG. 3c a magnitude table.
Figure 3B:
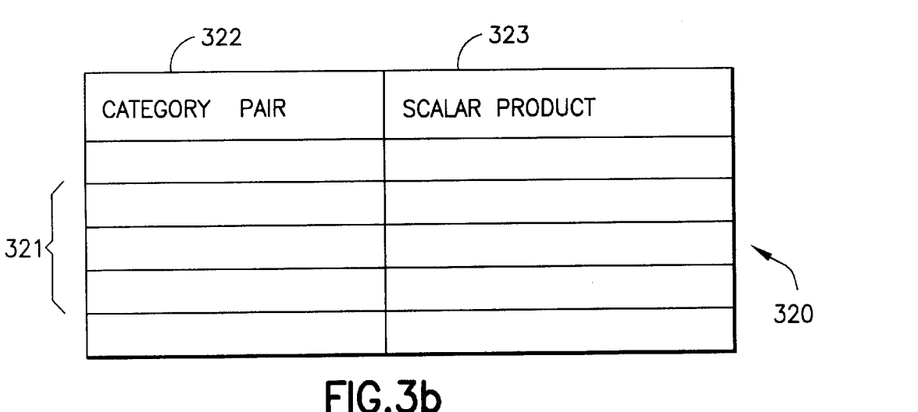
Figure 3C:
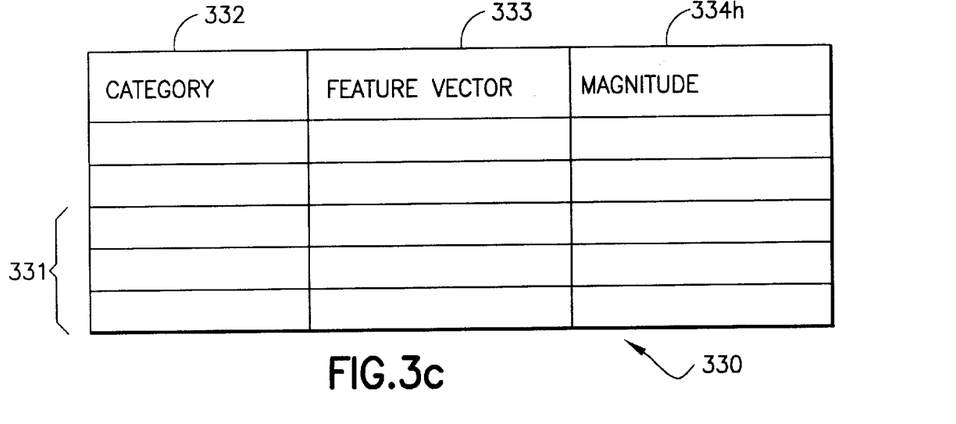

FIG. 3, comprising FIGS. 3a, 3b and 3c, depicts data-structures used in the mixed-category categorization process, and which comprise index 130. FIG. 3a shows a prior art feature vector 310. Records 311 are generated for every feature of interest. The feature itself is stored in field 312, and the value in field 313. The feature comes from field 272 of row 271 of feature table 370, and the value from weight field 274 from the same row 271. FIG. 3a shows the feature vector as an array, but a preferred embodiment would be an associative array or hash table. FIG. 3b shows a new scalar product table 320. There is a row 321 for each possible pair of categories. The category pair is listed in field 322, and the scalar product in field 323.

FIG. 3c shows a category magnitude table. There is a row 331 for every possible category. The category is listed in field 332, a pointer to a feature vector 310 in field 333, and its magnitude in field 334. The magnitude is taken from cell 282 of feature table 270.

Figure 9:
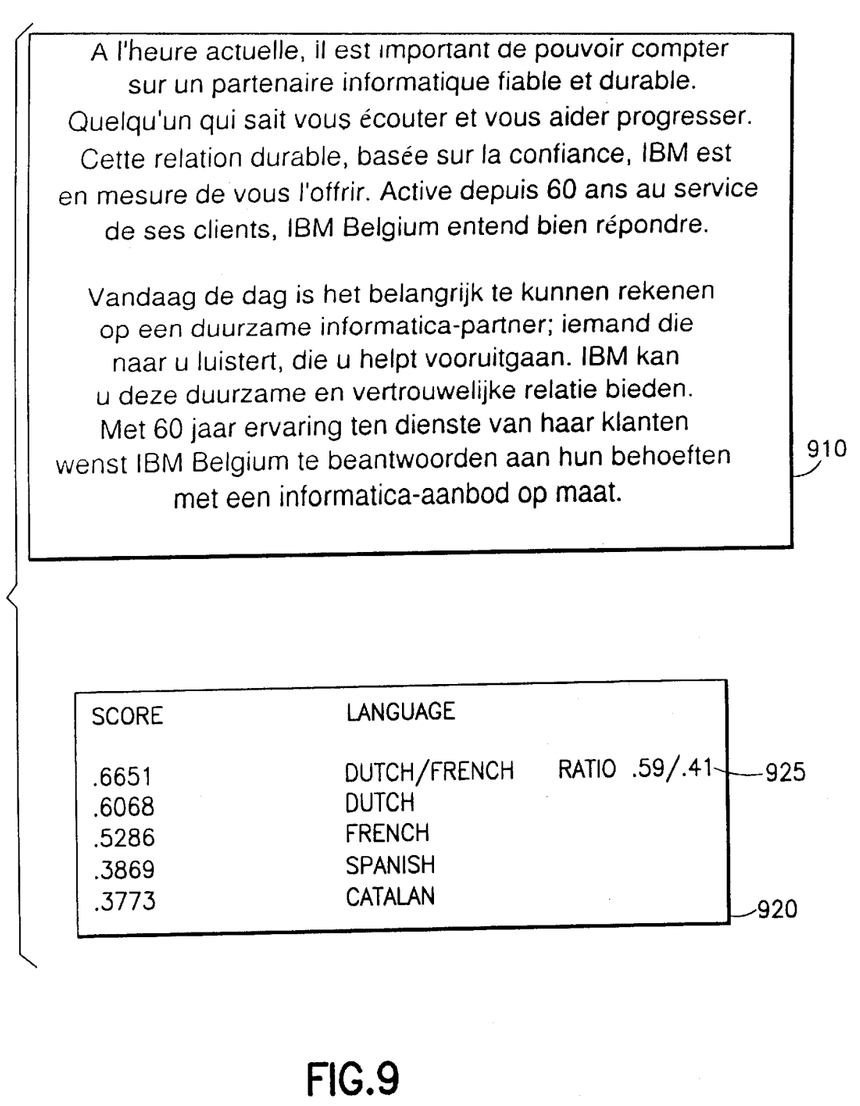
FIG. 9 depicts a sample mixed-language document and the results of applying the present invention to a language-categorization system.

It is sometimes the case that material in an object to be categorized is taken from the subject-matter (features) of two or more categories. [The following discussion concentrates on mixtures of two categories—the extension to three or more is straightforward and is contemplated in this disclosure.] Thus, while the object would make a partial match with the 'component' categories, it would make a very good match with a category, were it to exist, that consisted of a weighted average of the features of the component categories. An example object 910 is a document written in both French and Dutch—a categorizer would give it mediocre matches with the individual French and Dutch feature-sets, but a better match with a French/Dutch feature set if it existed.

It is not common practice, in developing a categorizer, to generate in advance mixtures of all of the intended categories, in anticipation of encountering a mixed object. Not only would this be expensive of space and computation time at run-time, but it would not be known in advance how to weight the component categories in the mixture. An alternative approach might be to generate mixed categories on the fly at the end of a categorization effort, for every pair in the top 5 (say) categories on the hit-list. This too would be computationally expensive (since the mixed feature-sets would have to be generated, and then comparisons performed), and it would still not be known how to weight the component categories.

The centroid or vector-space model lends itself best to the task of mixed-category identification. In this approach, feature-vectors are generated to represent each of the categories, and also the object under consideration. The category is sought which is the closest in the vector-space to the object (i.e. the category and the object have the largest cosine-distance). If a new category is composed of a mixture of two categories, its feature vector will be the weighted mean of the two categories, and its distance from the object in question is simply computed as the cosine-distance of the document from this weighted mean. The difficulty is that the weight used is unknown.

The approach that must be used would posit, in turn, a series of values of the weight, and compute the score of the so-generated mixed category. By observing the behavior of the score as the weight changes, the region of the optimum value can be identified and more weight values (with smaller increments) tested in this region, and the process repeated until it was judged that the score was close enough to the maximum. Given a single value of the weight, a feature vector would have to be created for the proposed mixed category, by combining proportionally the feature vectors of the component categories. This feature vector would then be matched with the test object's feature vector by performing the scalar product. In cases where the features number in the thousands, possibly tens or hundreds of thousands—a likely case if the objects are documents and the features are words and/or n-grams—then doing each scalar product is an expensive operation. But the scalar product needs to performed for every tentative value of the weight parameter, for every pair of categories being considered. Thus the computational expense of investigating if the mixed-category situation occurs is very much greater than just the cost of finding the best category (or categories) for an object. For situations such as the categorization of World-Wide-Web documents, where systems such as Yahoo identify tens of thousands of categories, the computational expense of finding the best (unmixed) categories is severe enough; the problem of mixed categories simply cannot be dealt with.

Figure 4:
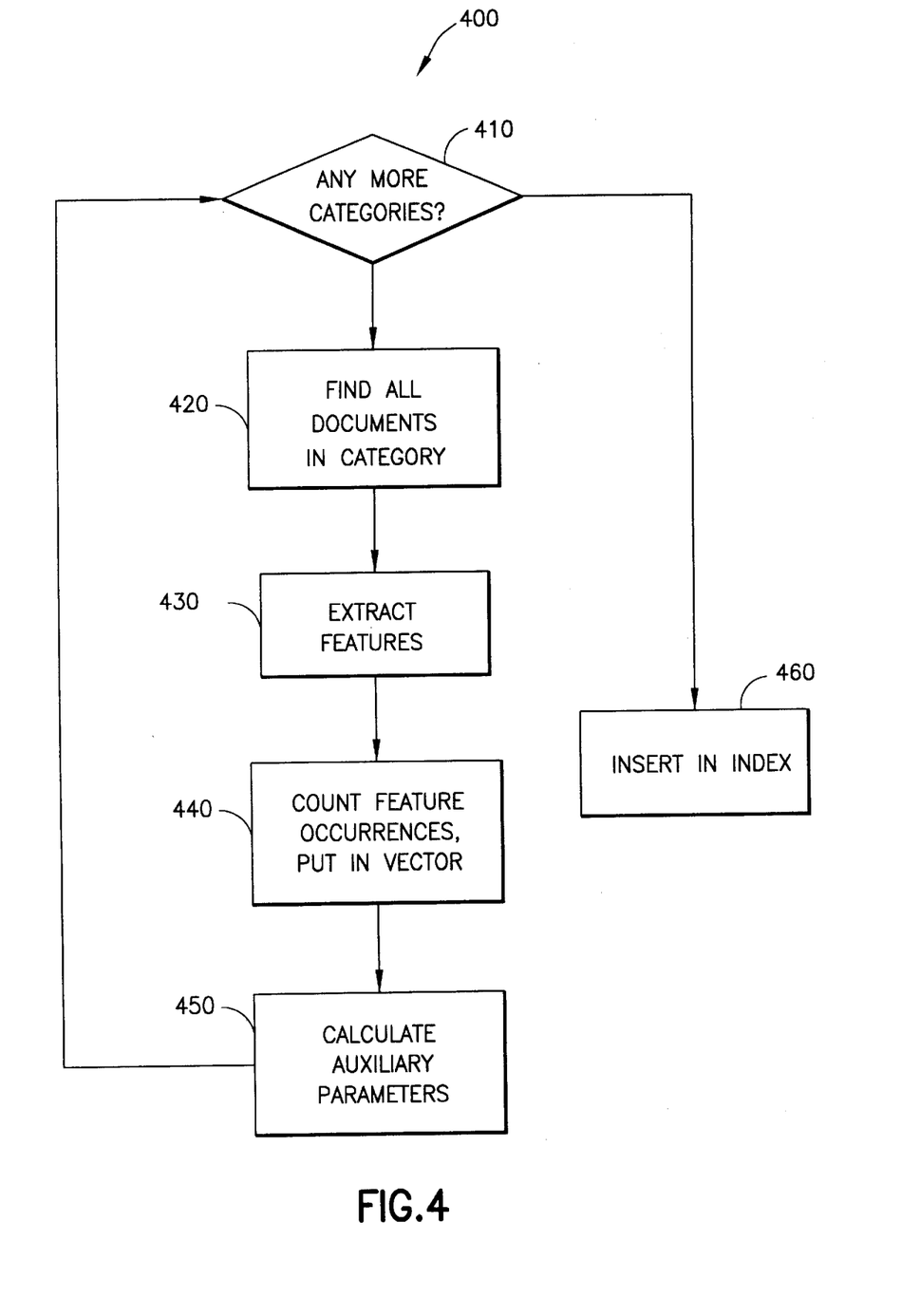
FIG. 4 is a flow chart of the steps of generating an index.

FIG. 4 is a flowchart showing the steps of the index generation process for every category C found in column 243 of category table 240. Step 410 controls the iteration through all categories C. If there are no more categories, branch 412 is taken, otherwise branch 414 is taken. In step 420, all documents D corresponding to category C are identified by reference to category table 240.

Step 430 is the feature extraction process. The exact details of this process are immaterial to this invention, but several examples will be given, for the case of text documents. A commonly used feature is the word: a word is a feature and the number of occurrences of the word in a document is the feature count. In a preferred embodiment, stemming or morphological analysis should be performed, to aggregate counts for different forms of a word (such as plurals etc.) into a single count. See the Salton 1989 reference cited earlier. Variations on the word would be phrases or n-grams (sequences of n successive letters). A row 271 is created for each feature in the collection of documents D. The feature is entered in field 272, and the count is entered in field 273. Field 274 is filled either with the same count value in field 273, or a weight as described in the description of FIG. 2e. When each feature has been entered in table 270, two more rows are created. The total row 275 is added and the entry 281 in weight column 274 is filled with the sum of the weight values in all rows 271. The magnitude row 276 is added and the entry 282 in weight column 274 is filled with the square root of the sum of the squares of the weight values in all rows 271.

In step 440, a feature vector 310 is created, and it and magnitude table 330 are filled with values from rows 271 in feature table 270. First, a row 331 in magnitude table 330 is created for category C. C is entered into field 332. A feature vector 310 is created, and a pointer to it inserted into field 333. The magnitude value 282 is copied into field 334. Next, for each row 271 in feature table 270: feature field 272 is copied to feature field 312 of feature vector 310, and weight field 274 is copied to value field 313 of feature vector 310.

Novel step 450 is then performed. In step 450, the novel scalar product table 320 is completed. For each category C' previously entered in row 331' of magnitude table 330, the scalar product of it and C is computed and entered into a new row 321 of scalar product table 320. The pair C-C' is entered into category pair field 322, and the scalar product is entered into field 323. The scalar product is computed in the standard way: let F be the feature table 310 corresponding to category C found by following pointer 333 in row 331, and F' the feature table 310' corresponding to category C' found by following pointer 333' in row 331'. Let f be a feature, and v be its value from feature table 310, v' its value from feature table 310'; v or v' will be zero if the feature f is not found in the corresponding table. Compute the sum of v*v' for every f found in F and F', and divide by the product of the magnitudes 334 and 334'. This "extra indexing information" in the scalar product table 320 is an indication of how close each category is with each other, by performing these pair-wise comparisons. This "extra information" is used later (process 800) to indicate a degree of match (e.g. a distance) between the document and a created virtual category.

In step 460 tables 310 for each category, 320 and 330 are stored in index 130.

Figure 5:
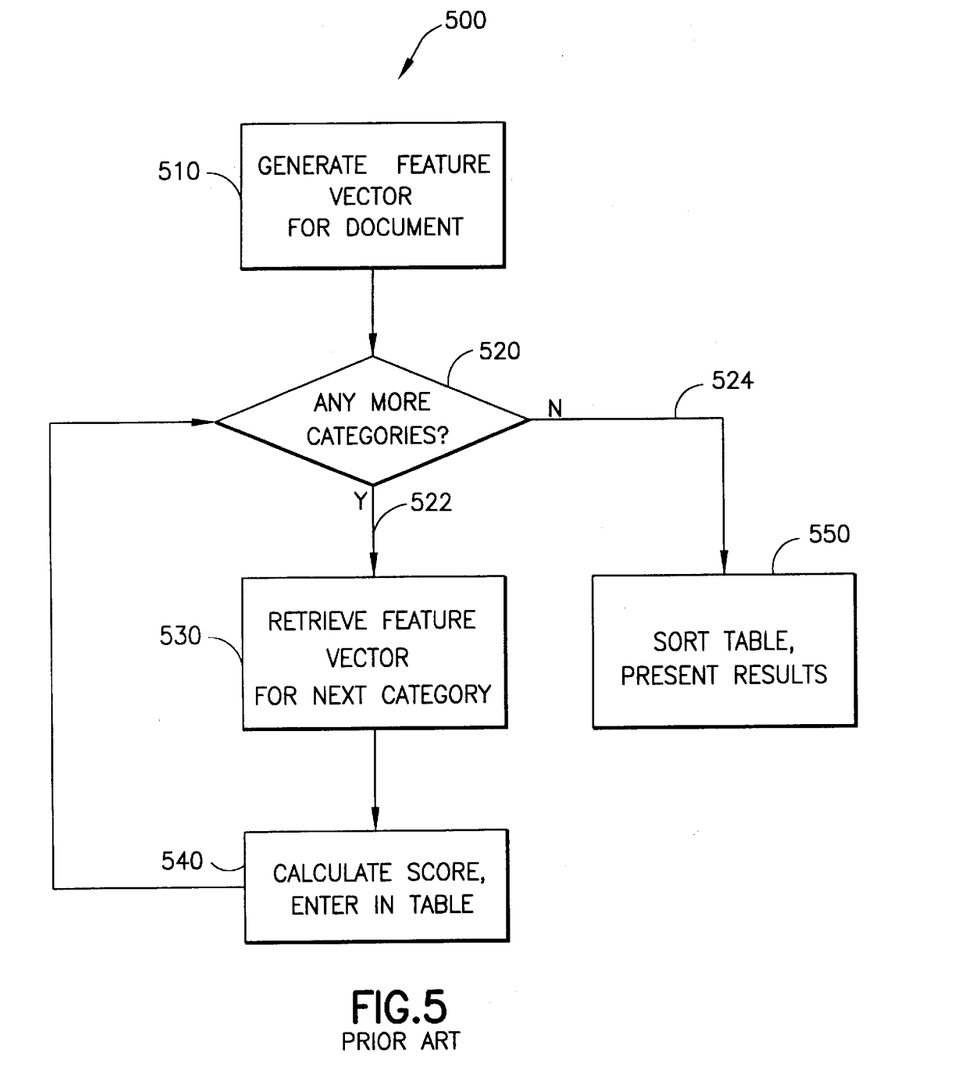
FIG. 5 is a flow chart of the prior art steps of a categorization process.

FIG. 5 is a flowchart showing the steps of an example general prior art categorization process 500. This process generates a hit-list of categories suggested for the document in question, with corresponding scores indicating degree of match. This process does not generate or suggest mixed categories. In step 510 the feature vector 310$d$ for document 210 is generated by following the steps 430 and 440. Step 520 controls the iteration through the categories. If there are no more categories, branch 524 is followed, otherwise category C is selected and branch 522 is followed. Row 251 of results table 250 is generated. In step 530 the feature vector 310$c$ for C is fetched from index 130. In step 540, the score being the scalar product between feature vectors 310$c$ and 310$d$ is calculated as in step 450, and is entered in score field 253 of row 251 in results table 250, and category C is entered in field 252. In step 550, results table 250 is sorted in order of decreasing score (field 253), and made available for display, inspection or further processing, as desired. The sorted results table is usually called a hit-list.

Figure 6:
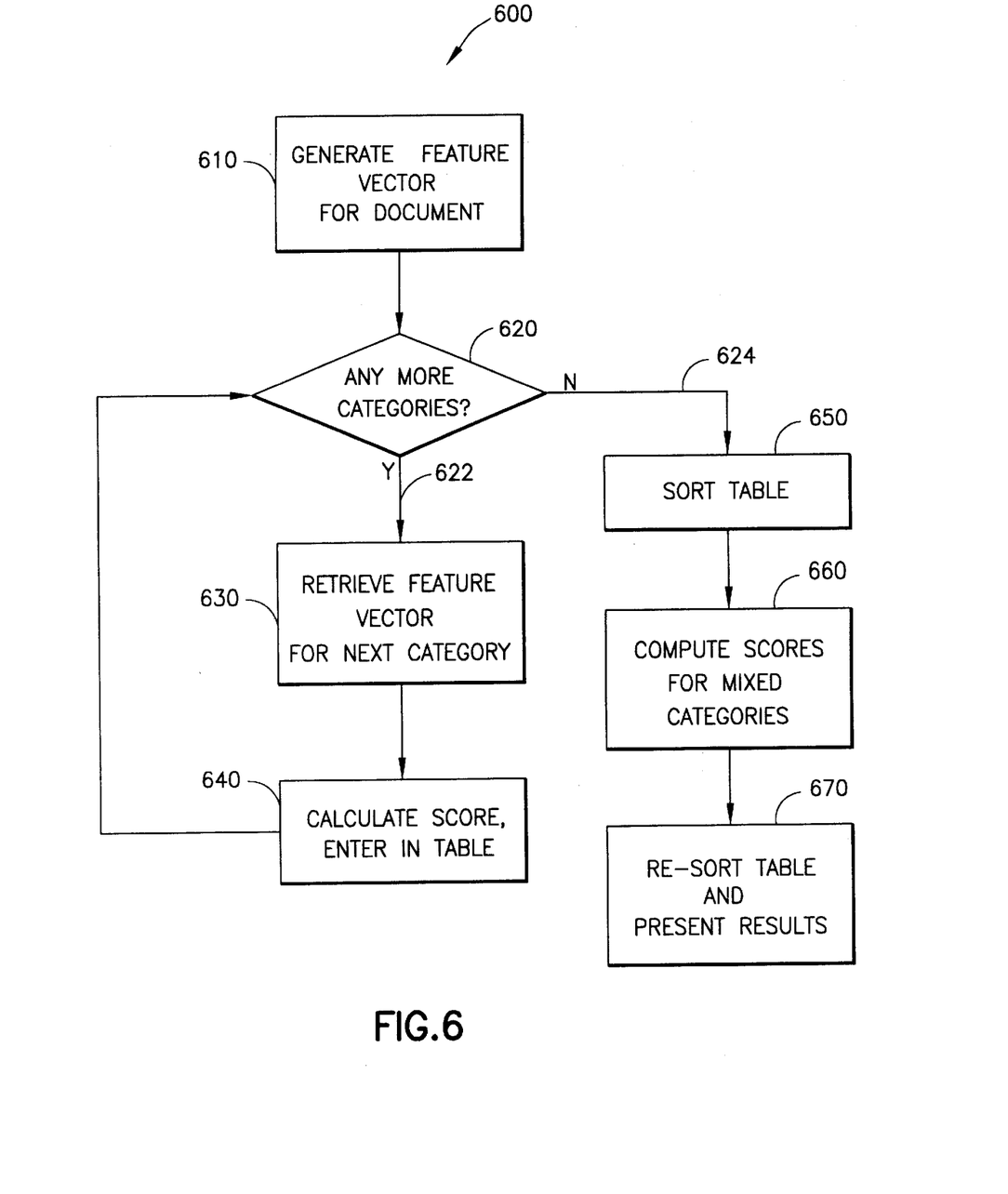
FIG. 6 is a flow chart of the steps of the overall mixed-category categorization process.

FIG. 6 is a flowchart showing the novel steps of a mixed-category categorization process 600. This process starts off identically to process 500. However, at the end novel extra processing is performed to determine if there are any appropriate mixed-categories to be added to the hit-list. In step 610 the feature vector 310$d$ and feature table 270$d$ for document 210 are generated by following the steps 430 and 440. Step 620 controls the iteration through the categories. If there are no more categories, branch 624 is followed, otherwise category C is selected and branch 622 is followed. Row 251 of results table 250 is generated. In step 630 the feature vector 310$c$ for C is fetched from index 130. In step 640, the score being the scalar product between feature vectors 310$c$ and 310$d$ is calculated as in step 450, and is entered in score field 253 of row 251 in results table 250, and category C is entered in field 252.

In step 650, results table 250 is sorted in order of decreasing score (field 253). This sorted table is a tentative hit list.

At this point, there is no knowledge of whether the document 210 belongs to mixed categories. Succeeding steps of this process test this scenario by selecting pairs of high-scoring categories in the tentative hit-list, and determining the matching score of document 210 with a weighted average of the pair. Part of the computation is to determine the value of weight $\alpha$ which optimizes the score, for a given pair of categories.

The following steps compute the score for optimum mixtures of each pair of categories at the top of the tentative hit list. If the absolute best category for document D is a mixture of categories G and H, say, then it is to be expected that, individually, categories G and H appear very close to the top of the tentative hit list. Therefore the following steps are taken for the top k categories, for a small integer k. In a preferred embodiment, k is in the range of 2 to 20, but more preferably a value of k=5 is used.

In step 660, every pair G-H of categories amongst the top k categories in the tentative hit-list is considered. The details of step 660 are shown in FIG. 8.

Described here is the process of determining first the optimal weighting of two candidate component categories, and then the matching score of the object to be categorized with the would-be mixed category. This process relies on computing and saving certain quantities during index creation, and combining them in a simple computation to determine the weights and mixed-category scores.

Figure 8:
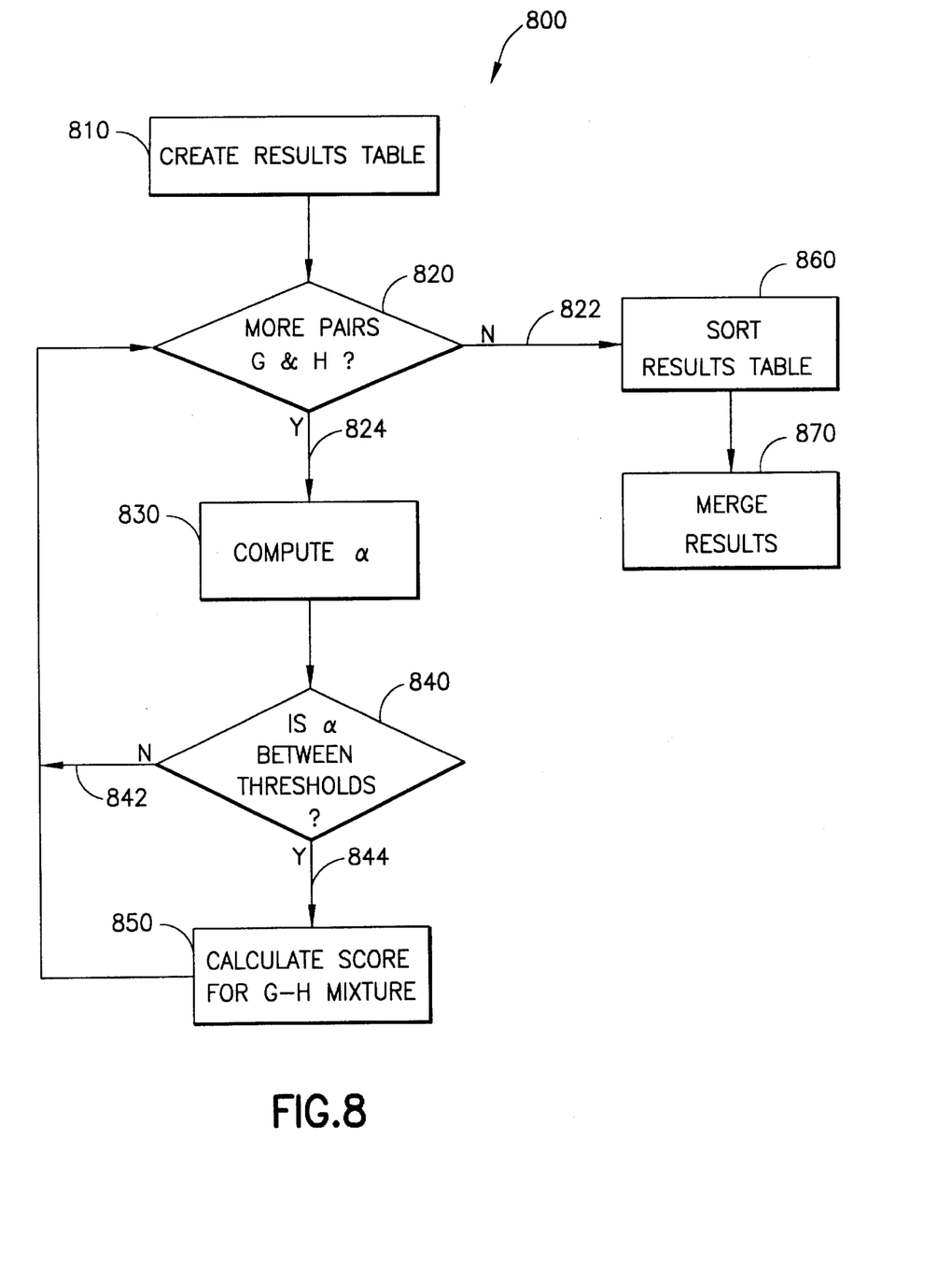
FIG. 8 is a flow-chart of the steps of computing scores for mixed categories.

FIG. 8 is a flowchart 800 showing the steps of mixed-category categorization process 660. In step 810 a new results table 250$n$ is created.

Step 820 controls the iteration through all distinct pairs of categories in the top k categories in the tentative hit-list 250. If there are no more pairs, branch 822 is taken, otherwise branch 824 is taken.

As a preliminary explanation of FIG. 8, consider the following: Let D be an object 210 with feature-vector d.

Let |d| be the magnitude of object D.

Let G and H be categories, with feature-vectors g and h.

Mathematically, the procedure to compute the score of matching D with the weighted mean of G and H, using $\alpha$ as the weight, is as follows.

Let $\hat{g}$ and $\hat{h}$ be corresponding unit vectors.

Let |g| and |h| be the magnitudes of vectors g and h.

Let $\hat{g}.\hat{h}$ be the stored unit-dot product of g and h.

Let s(g) and s(h) be the scores of categories G and H in the results table 250.

Figure 7:
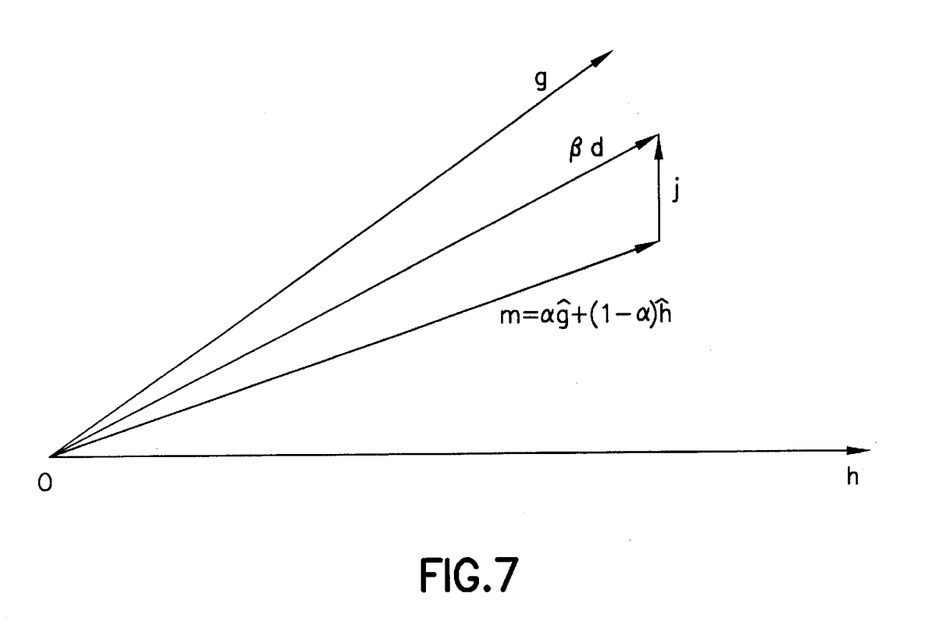
FIG. 7 depicts the geometrical reasoning behind the formula for computing the optimal mixture of two categories.

FIG. 7 shows the geometric interpretation of the formula used to compute how the mixture is proportioned between G and H (the weight $\alpha$). In FIG. 7, d is a vector out of the plane of $\hat{g}$ and $\hat{h}$ representing an arbitrary document. Any vector in the plane of $\hat{g}$ and $\hat{h}$ represents a mixture of $\hat{g}$ and $\hat{h}$. The vector m in this plane, given by $\alpha\hat{g}+(1-\alpha)\hat{h}$, is the projection of $\beta$d, for some scalars $\alpha$ and $\beta$, and so is the vector in this plane which is the closest to d, as measured by cosine distance.

Orthogonality conditions are: $j=\beta d-m$; $j.m=j.\hat{g}=j.\hat{h}=0$
Solving gives: $\alpha=(d.\hat{h}\hat{g}.\hat{h}-d.\hat{g})/[(d.\hat{g}+d.\hat{h}\hat{h})(\hat{g}.\hat{h}-1)]$ This $\alpha$ is the weight used in the weighted average of $\hat{g}$ and $\hat{h}$ to provide the best match with d. d.$\hat{g}$ and d.$\hat{h}$ are the straightforward scalar products of d with $\hat{g}$ and $\hat{h}$ and are computed as a matter of course in categorizing d. The product $\hat{g}.\hat{h}$ is computed and stored while the index is being created.

In step 830, for category pair G and H, the following data values are collected: their scores s(g)=253g and s(h)=253h; their magnitudes |g|=333g and |h|=333h from magnitude table 330; document magnitude |d|=282d from feature table 270$d$; unit dot-product $\hat{g}.\hat{h}$=323gh from scalar product table 320. The following five computations complete step 830:
Compute d.$\hat{g}$=s(g)*|d|
Compute d.g=s(g)*|d|*|g|
Compute d.$\hat{h}$=s(h)*|d|
Compute d.h =s(h)*|d|*|h|
Compute $\alpha=(d.\hat{h}*\hat{g}.\hat{h}-d.\hat{g})/[(d.\hat{h}+d.\hat{g})*(\hat{g}.\hat{h}-1)]$ The $\alpha$ determined by this calculation is the proportion of a first category in the pair of categories making up a virtual category. In other words, a virtual mixed category, M, made up of categories G and H, has a proportion $\alpha$ of G and (1-$\alpha$) of H.

In step 840, weight $\alpha$ is tested. If a is too close to 0 or 1, it is quite possible that document D 210 belongs to category G or H directly, and is maybe contaminated with a little noise. So for suitable thresholds $t_1$ and $t_2$, if $\alpha<.t_1$ or $\alpha>.t_2$, no mixture is identified, and branch 842 is taken.

In a preferred embodiment, $t_1$ is 0.1, $t_2$ is 0.9.

In step 850:

Compute $|m|^2=\alpha^2|g|^2+(1-\alpha)2|h|^2+2\alpha(1-\alpha)|g||h|\hat{g}.\hat{h}$ Compute s(m)=score for M as optimal blend of G and H=[$\alpha$d.g+(1-$\alpha$)d.h]/(|d||m|)

The pair G-H along with score s(m) is then entered in results table 250n.

After considering all G-H pairs, step 860 is executed. In step 860, the new results table 250n is sorted. In step 870, the results are merged into prior results table 250. In a preferred embodiment, only the top value of sorted results table 250n need be merged with prior table 250, and then only if it exceeds the current top value of table 250.

FIG. 9 shows the results of applying this invention, as a part of a language identification system to a mixed-language document. Document 910 is a part of a real World-Wide-Web page about IBM Belgium, and is written in both Dutch and French. Hit-list 920 shows the results of categorizing the document, and is the visual representation of internal results table 250. The leading score is for the mixed-category Dutch/French, which was not one of the feature-sets 141 with which the categorizer was originally trained. The ratio 925 depicts the weight, $\alpha$, and its complement (1-$\alpha$).

There are many commercial uses for categorization technology, in particular uses that can benefit from the present invention. These uses all involve an incoming stream of documents, and the need to sort these documents into different 'buckets', either for purposes of prioritizing attention by a single individual, or to route the documents to different individuals. These different document streams include:

e-mail (in any business)

insurance claims (insurance industry)

news stories (publishing/distribution industries)

help-desk calls (service industries)

Typically, a categorization process will identify the top category matching the document, and dispatch it to the appropriate receiver. With mixed-category identification, enabled by this invention, it now becomes easy to tell if the document should be sent in two directions.

For example, an e-mail categorization system might sort one's electronic mail into different 'buckets' for processing at different times; an e-mail inviting one to dinner with one's boss might be categorized as both 'important' and 'personal'.

In an insurance company's office, an insurance claim about a car careening off a dock and hitting a boat might be sent to both automobile and marine insurance experts.

So-called 'notification services' or 'alert services' allow users to establish interest profiles, and news items that arise and match a user's profile will be sent to him. A news story about a runaway horse interrupting a tennis match might be sent to users who have registered interest in sports and also those interested in animal stories.

A help-desk call to a computer company concerning a piece of software which will reliably cause an attached peripheral to become permanently disabled might be sent to both software and hardware specialists.

I claim:

1. A system for combining categories for categorizing objects, comprising:

a computer with a memory and a central processing unit (CPU), the memory having one or more documents with one or more document features, the memory further having two or more categories;

a categorization process, executed by the CPU, that matches the document features against the categories to determine a score indicating a degree of match that is stored in the memory as a plurality of result entries in a result table with the result entries sorted by score and the categorization process determining a magnitude of a document feature vector;

a pair-wise scalar product table, stored in the memory, that has a plurality of pair-wise comparisons of one or more pairs of a first and second category to determine a degree of similarity between the first and second category in the pair, the degree of similarity being stored in the memory, the categorization process generating the degree of similarity, the categorization process further generating a magnitude of a category feature vector for each category that is also stored in memory;

a combining process, executed by the CPU, that selects candidate pairs entries in the result table where the entries meet a criterion; and a weight determination process, executed by the CPU, that determines a pair weight that indicates how the first and second category in each candidate pair are weighted with respect to each other to form a virtual mixed category using the degree of similarity between the first and second categories, the magnitude of the category feature vector for the first and second categories, the degree of match between the document and each of the first and second categories, and magnitude of the document feature vector.

2. A system, as in claim 1, where a virtual degree of match between the document and the virtual mixed category is determined using the pair weight, the degree of similarity between the first and second categories, the magnitude of the category feature vector for the first and second categories, the degree of match between the document and each of the first and second categories, and magnitude of the document feature vector.

3. A system, as in claim 2, where the virtual mixed category and the virtual degree of match are entered in the results table.

4. A system, as in claim 3, where the virtual mixed category is entered in the results table only if the virtual degree of match is higher than the best degree of match in the results table.

* * * * *